United States Patent [19]

Soederberg

[11] Patent Number: 4,489,904
[45] Date of Patent: Dec. 25, 1984

[54] ACTUATING MECHANISM FOR AN AUXILIARY POWER SOURCE

[75] Inventor: Richard Soederberg, Moeglingen, Fed. Rep. of Germany

[73] Assignee: Ing. h.c.F. Porsche AG, Fed. Rep. of Germany

[21] Appl. No.: 472,113

[22] Filed: Mar. 4, 1983

[30] Foreign Application Priority Data

Mar. 6, 1982 [DE] Fed. Rep. of Germany ....... 3208150

[51] Int. Cl.³ .................. B64C 19/00; B64D 33/00
[52] U.S. Cl. ................ 244/75 R; 244/53 R; 244/235; 74/52; 74/502; 292/150; 292/DIG. 31
[58] Field of Search ............. 244/53 B, 53 R, 23 S, 244/75 R, 37; 74/501 R, 502, 526, 527, 56 S; 292/150, 141, 143, 171, DIG. 31

[56] References Cited

U.S. PATENT DOCUMENTS

| 1,955,969 | 4/1934 | Marzolf | 292/143 |
| 2,525,642 | 11/1950 | Bradshaw | 292/143 |
| 2,819,033 | 1/1958 | Boyce | 74/502 |
| 3,479,903 | 11/1969 | Hermanson et al. | 74/502 |
| 3,744,339 | 7/1973 | Martinson | 74/526 |
| 4,038,718 | 8/1977 | Reilhac et al. | 292/DIG. 31 |

FOREIGN PATENT DOCUMENTS 106158  8/1924  Switzerland .................. 292/143

Primary Examiner—Galen L. Barefoot
Attorney, Agent, or Firm—Craig & Burns

[57] ABSTRACT

An actuating mechanism, for putting into operation a ram-air turbine of an aircraft, includes a slide member linearly moveable and connected with a Bowden cable which is actuatable in dependence on a blocking mechanism. In order that the actuating installation can be operated in a simple and safe manner, the blocking mechanism is connected with a hand lever which in the opened condition releases the blocking mechanism and cooperates with a support element of the slide member in such a manner that the slide member is adapted to be displaced into an end position by means of the hand lever.

14 Claims, 5 Drawing Figures

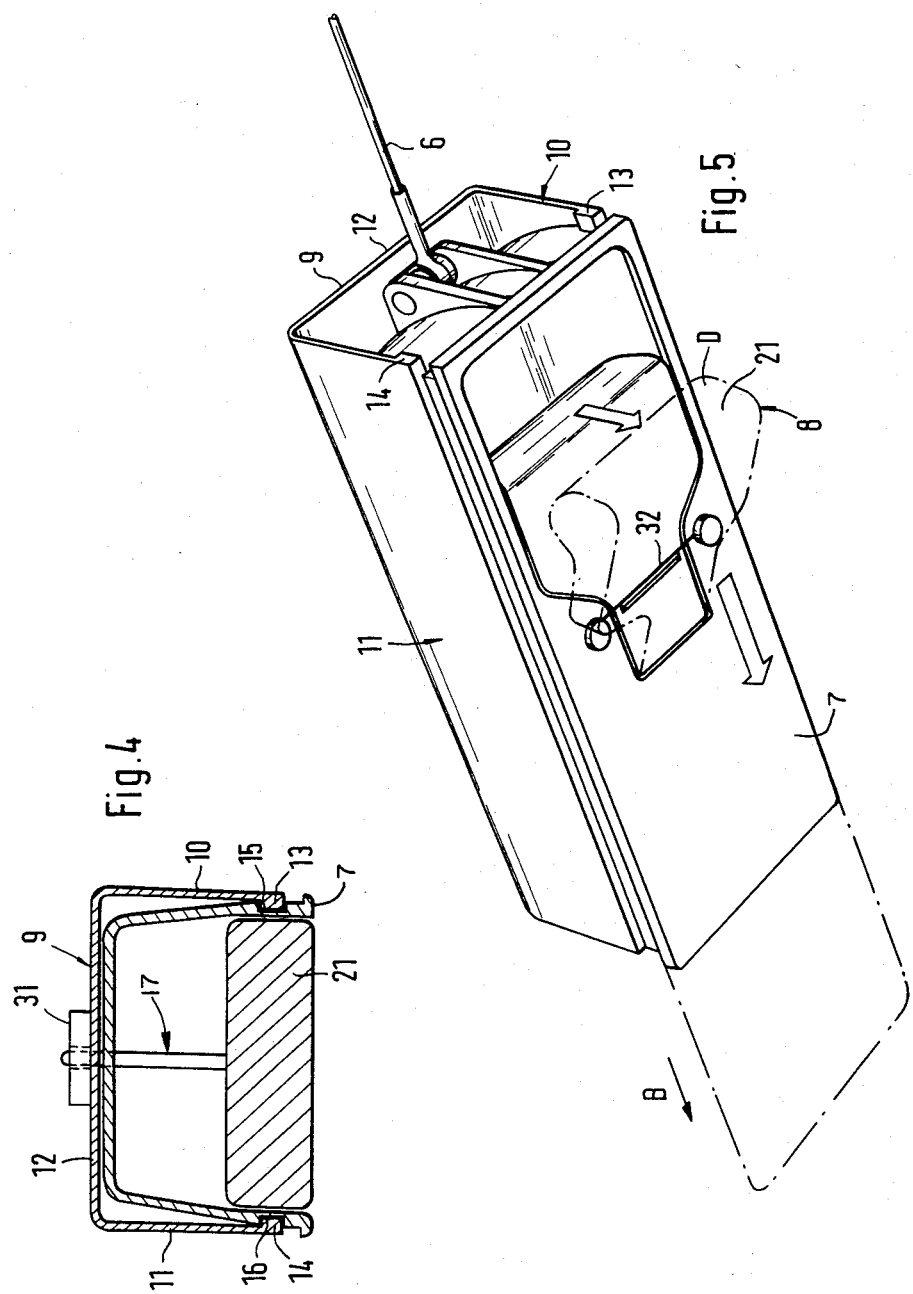

ACTUATING MECHANISM FOR AN AUXILIARY POWER SOURCE

The present invention relates to an actuating mechanism for putting into operation a ram-air turbine of an aircraft. The mechanism includes a linearly moveable sliding member connected with a Bowden cable, the sliding member being actuatable when released by a blocking mechanism.

Ram-air turbines in aircraft serve as emergency electric current generator aggregates and are arranged, for example, behind a flap that is adjustable by means of an actuating mechanism adapted to be operated by the pilot.

A known actuating installation includes a free-standing lever arranged behind the pilot seat on a lateral part, whereby, after pulling up a locking device, the lever is pivoted transversely to the vehicle longitudinal direction in a guide.

This prior art construction entails the disadvantage that the actuating installation, even though needed relatively rarely, is arranged in a dominating manner, whereby its non-recessed lever is prone to cause injuries.

Additionally, the movement steps to be carried out by the pilot for actuating the lever are complex.

Therebeyond, a prior art actuating mechanism (U.S. Pat. No. 3,744,339) includes a slide member connected with a Bowden cable and a blocking mechanism, whereby the travel of the slide member can be adjusted by means of a blocking mechanism provided with a key-lock.

This actuating installation is not suitable for putting a ram-air turbine into operation since the lock of the blocking mechanism, which is to be opened by means of a key, makes difficult the spontaneous actuating thereof.

Accordingly, it is the object of the present invention to provide an actuating installation which can be serviced in a simple and safe manner and which assumes a non-disturbing position.

The underlying problems are solved according to the present invention in that the blocking mechanism is connected with a hand lever which in the opened condition releases the blocking mechanism and cooperates with a support element of the slide member in such a manner that the slide member is adapted to be displaced into an end position by means of the hand lever.

The advantages achieved primarily by the present invention reside in that the actuating mechanism with its hand lever and its slide member can be accommodated recessed in a defined manner at an inner wall of an aircraft and by its constructive design corresponds to ergonomic design criteria, which means its handling is simple and safe for the pilot. The blocking mechanism is released by the handle, which is constructed as a two-armed lever, and the slide member is actuated thereby. The handle, accessible by way of a recess, can be seized safely and reliably. The slide member and the housing may be made as a preassembled structural part and can be easily installed thereafter into the aircraft.

These and other objects, features and advantages of the present invention will become more apparent from the following description when taken in connection with the accompanying drawing which shows, for purposes of illustration only, one embodiment in accordance with the present invention, and wherein:

FIG. 4 is a cross-sectional view taken along line IV—IV of FIG. 3; and

FIG. 5 is a perspective view of the actuating mechanism in accordance with the present invention.

Figure 1:
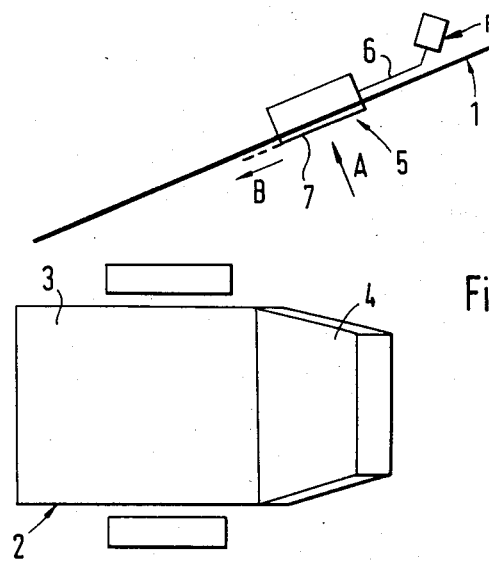
FIG. 1 is a schematic plan view showing the position of a pilot's seat relative to an inner side wall of an aircraft with the actuating mechanism associated with the side wall in accordance with the present invention.

Referring now to the drawing wherein like reference numerals are used throughout the various views to designate like parts, and more particularly to FIG. 1, an inner side wall 1 of an aircraft (not shown in detail) is illustrated schematically in this figure and more particularly the side wall is shown within the area of an aircraft cockpit. A seat is generally designated by reference numeral 2 which includes a seat part 3 and a backrest 4. An actuating mechanism generally designated by reference numeral 5 is provided at the inner wall 1 adjacent the backrest 4. A ram-air turbine (shown schematically as F), i.e., an auxiliary power source, can be put into operation by means of the actuating installation 5. A Bowden cable 6 is provided between the actuating mechanism 5 and the ram-air turbine, respectively, i.e., a ram-air turbine flap (not shown) which when opened permits the flow of air to operate the ram-air turbine, i.e., the auxiliary power source, to supply emergency electricity for the aircraft.

Figure 3:
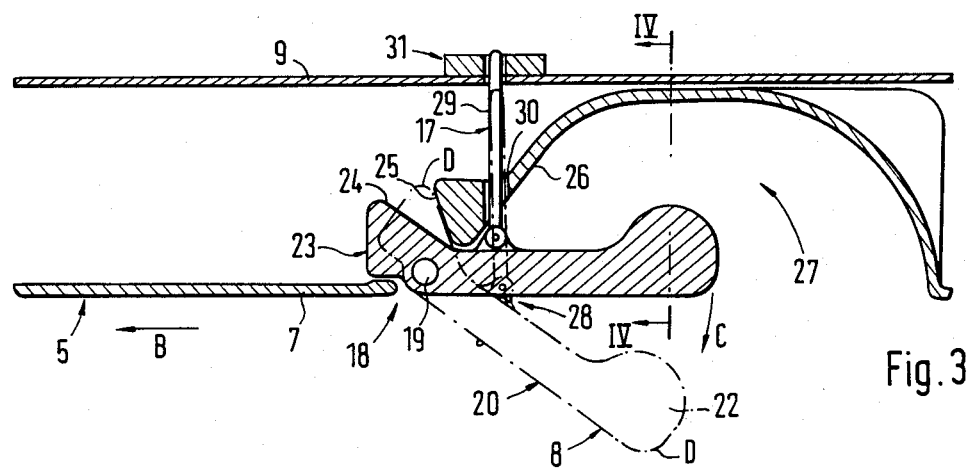
FIG. 3 is a cross-sectional view taken along line III—III of FIG. 2.

The actuating installation 5 includes a slide member 7 movable linearly—in the direction of arrow B (FIG. 3)—and a hand lever 8. The slide member 7 is constructed in the manner of a drawer and is inserted into a housing 9 which has a U-shaped cross section with side walls 10 and 11 and a cross wall 12 connecting the side walls 10 and 11. Enlargements 13 and 14 are provided at the free ends of the side walls 10 and 11 which engage into U-shaped recesses 15 and 16 of the slide member 7 (FIG. 4).

The hand lever 8, connected with a blocking mechanism generally designated by reference numeral 17, is constructed as two-armed lever and is pivotally supported at 18 about a bearing shaft 19.

The first arm 20 of the hand lever 8 is constructed as handle part 21 having a width approximately corresponding to the width of a hand, which is provided at its free ends with a thickened portion 22 (FIG. 3); the second arm 23 includes an abutment 24 for engaging a support element 25. The support element 25 is provided on the wall 26 of a recess 27, by way of which the handle part 20 is accessible.

The blocking mechanism 17 is formed by a pin 29 pivotally connected at the first arm 20 of the level 8 at 28; the pin 29 extends through an opening 30 in the wall 26 and engages in apertured mounting member 31 of the cross wall 12 of the housing 9.

The housing 9 and the slide member 7 together with the hand lever 8 and the blocking mechanism 17 form a preassembled structural unit, whereby the housing 9 is retained at the inner wall 1 by means of fastening members (not shown) of any conventional type.

Figure 2:
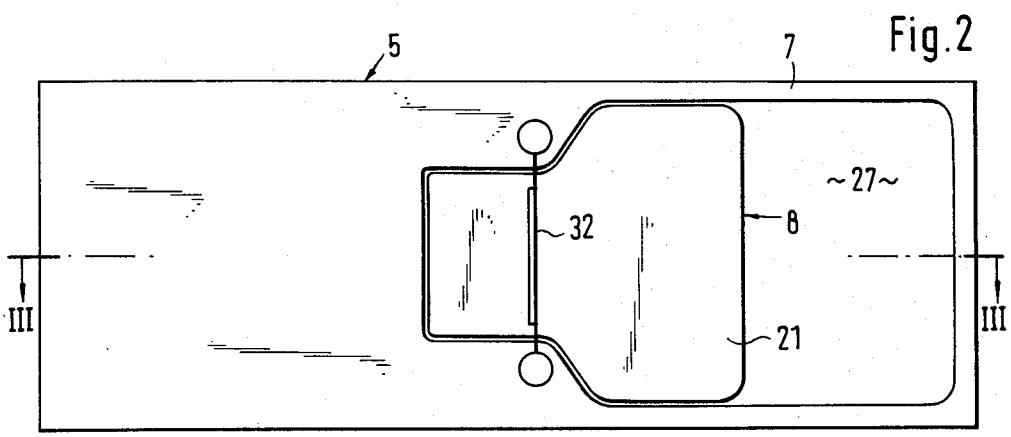
FIG. 2 is an elevational view, on an enlarged scale, of the actuating mechanism in accordance with the present invention, taken in the direction of arrow A in FIG. 1.

If the ram-air turbine is to be put into operation, e.g., when auxiliary power is needed, the hand lever 8 is moved in the direction of arrow C (FIG. 3) against the resistance of a tearable safety wire 32 (FIG. 2) so that the abutment 24 comes into engagement with the support element 25 (position D); this movement withdraws the pin 29 from engagement with the mounting member 31. The slide member 7 can then be displaced in the direction of arrow B, as a result of which a flap is opened by way of a Bowden cable 6 and, thus, the ram-air turbine is operable by the flow of air.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An actuating mechanism associated with a ram-air turbine comprising means for housing a movable slide means, movable slide means connected to a Bowden cable for controlling said ram-air turbine, hand lever means pivotally supported by said movable slide means for moving said movable slide means, blocking means associated with said hand lever means for cooperating with said means for housing to preclude movement of said movable slide means, wherein pivoting of said hand lever means disengages the cooperation of said blocking means and said means for housing and moves said movable slide means.

2. An actuating mechanism according to claim 1, wherein the hand lever means is formed by a two-armed lever whose first arm includes a handle portion and whose second arm includes an abutment for engaging a support element on said movable slide means.

3. An actuating mechanism according to claim 2, wherein the free end of the handle portion is provided with a thickened portion.

4. An actuating mechanism according to claim 2, wherein the handle portion is constructed of a width approximately corresponding to the width of a hand and is accessible by way of a recess provided in the movable slide means.

5. An actuating mechanism according to claim 2, wherein the slide means is guided in the means for housing in the manner of a drawer in a fixed housing means, the movable slide means and the means for housing cooperating by way of complementary guide means.

6. An actuating mechanism according to claim 5, wherein said means for housing has a generally U-shaped cross section.

7. An actuating mechanism according to claim 6, wherein said complementary guide means includes enlargements on one of the movable slide means and the means for housing and recess means on the other of said movable slide means and said means for housing.

8. An actuating mechanism according to claim 6, wherein the blocking means includes a pin attached to said first arm, said pin extending through an opening in a wall of the recess in said movable slide means and projecting into a mounting means associated with the means for housing.

9. An actuating mechanism according to claim 8 wherein the actuating mechanism is arranged recessed in an inner wall of an aircraft adjacent a pilot seat and the movable slide means is displaceable in the flight direction.

10. An actuating mechanism according to claim 1 wherein the movable slide means is installed in the manner of a drawer in the means for housing, the movable slide means and the means for housing cooperating by way of complementary guide means.

11. An actuating mechanism according to claim 10, wherein said means for housing has a generally U-shaped cross section.

12. An actuating mechanism according to claim 10, wherein said complementary guide means includes enlargements on one of the movable slide means and the means for housing and recess means on the other of said movable slide means and said means for housing.

13. An actuating mechanism according to claim 2, wherein the blocking means includes a pin attached to said first arm, said pin extending through an opening in a wall of a recess in the movable slide means and projecting into a mounting means in the means for housing.

14. An actuating mechanism according to claim 1, wherein the actuating mechanism is arranged in a recessed manner at an inner wall of an aircraft adjacent a pilot seat and the movable slide means is displaceable in the flight direction.

* * * * *